(12) United States Patent
Mah

(10) Patent No.: US 7,226,162 B2
(45) Date of Patent: Jun. 5, 2007

(54) AUDIO LANYARD

(75) Inventor: Pat Y. Mah, Kowloon (HK)

(73) Assignee: Daka Research Inc. (Br. Virg.Isl Corp.) Offshore Operations, Tortolla, Br. (VG)

( * ) Notice: Subject to any disclaimer, the term of this patent is extended or adjusted under 35 U.S.C. 154(b) by 1 day.

(21) Appl. No.: 11/165,294

(22) Filed: Jun. 22, 2005

(65) Prior Publication Data

US 2006/0290879 A1    Dec. 28, 2006

(51) Int. Cl.
*G02C 1/00* (2006.01)
(52) U.S. Cl. ............... 351/158; 381/381; 455/347
(58) Field of Classification Search ............ 351/158; 206/5; 381/370, 381; 455/347, 350, 351
See application file for complete search history.

(56) References Cited

U.S. PATENT DOCUMENTS

2005/0078274 A1* 4/2005 Howell et al. ............ 351/158
2006/0034478 A1* 2/2006 Davenport ................ 381/381
2006/0177086 A1* 8/2006 Rye et al. ................. 381/370

* cited by examiner

*Primary Examiner*—Huy Mai
(74) *Attorney, Agent, or Firm*—Harrington & Harrington; Curtis L. Harrington; Kathy E. Harrington

(57) ABSTRACT

An audio lanyard audio device provides a number of advantages not seen with earlier devices, including, (1) a pair of soft openings to accept the ear pieces of conventional eyewear in a manner that supports and engages several inches of the ear pieces of conventional eyewear with sufficient surface area and friction to hold the conventional eyewear securely, (2) provision of a length of softer foam material for fitting both the lanyard and convention eyewear ear pieces between the ear and head, (3) formation of a balanced combination when worn with conventional eyewear, and (4) the location of the controls and main electronics and battery at the rear for balance and easy reach by a user.

12 Claims, 2 Drawing Sheets

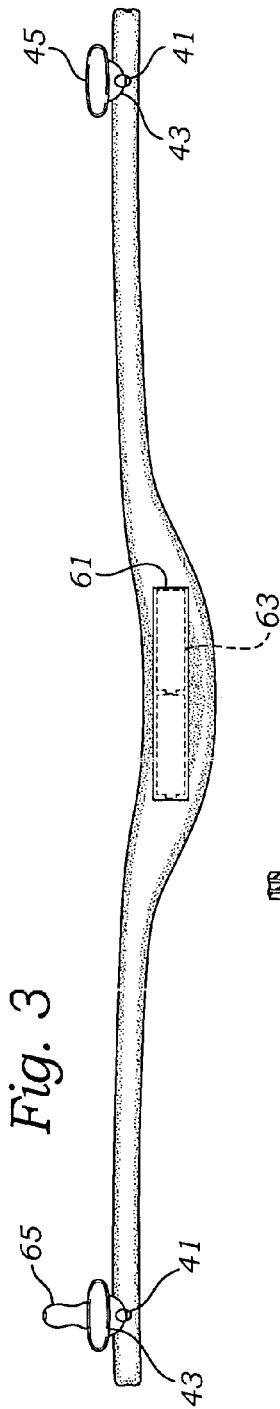
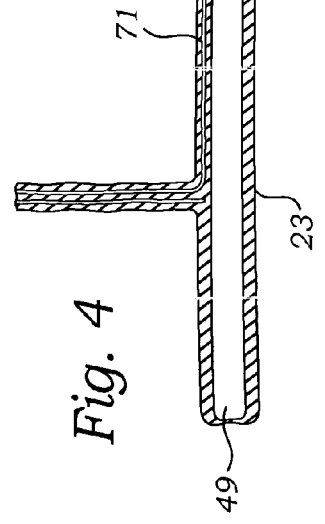
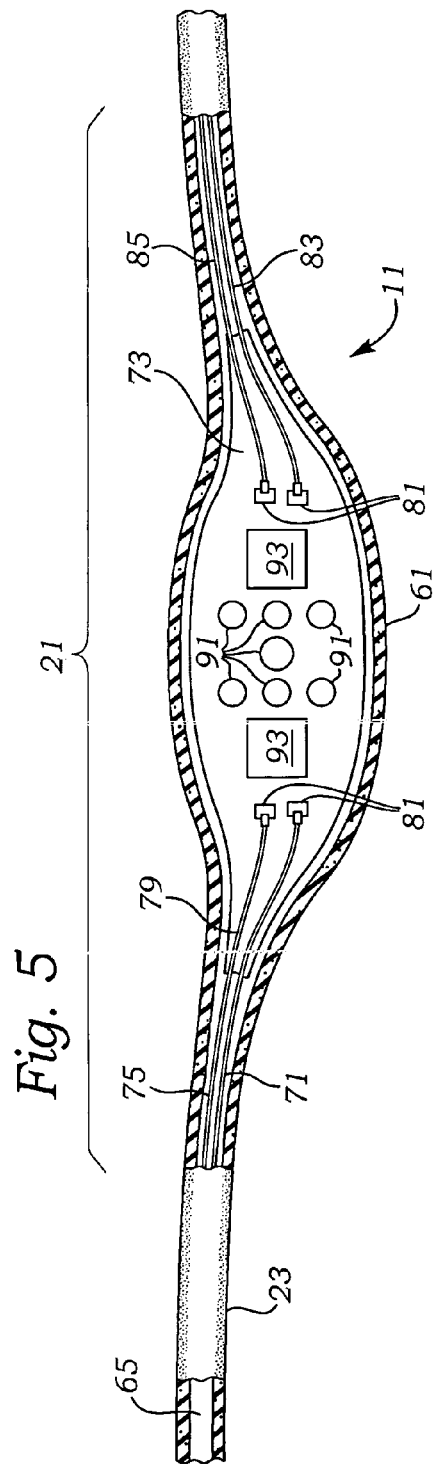

AUDIO LANYARD

FIELD OF THE INVENTION

The present invention relates to personal listening equipment and appliances and more particularly to an integrated audio lanyard which can be utilized with conventional eyewear having ear supports, which has a more water tight design, and which can be used as a conventional eyeglass lanyard.

BACKGROUND OF THE INVENTION

A number of personal audio systems have been developed for use by active persons. One of the best examples is an audio headset having two ends joined by a flexible support. The electronics for operation are located adjacent the ends of the flexible support, which typically extend to and perhaps may derive support from the user's ears. The flexible support may be worn in positions ranging from an upper position across the users skull, to a rearward position across the back of a user's head.

There are several disadvantages from this design. The first is the bulkiness of locating the electronics in housings outside the ears. Typically this causes two compensating aspects of the design, namely the articulation of the housing with respect to the ear supports and/or the independent articulation of the supported speaker portions. Further, where the audio appliance is used during sports activities, the bulky, outboard electronics and speakers may be damaged from racquet balls, tennis balls, or from the arms and hands of the user.

A second problem is that for "headphone style" designs, the bulk of the weight of the electronics and speakers are borne by a strap or other support (typically adjustable) over the head. Where the adjustability can slip, the user must continually re-adjust the electronics and speakers in alignment with the ear opening, especially when jogging. Where the design depends solely upon the ears for vertical support, the outer ears bear the total vertical support for the weight of the device, making it uncomfortable to wear the device for long periods.

A third problem, especially for eyeglass wearers, is the competition for the area between the upper external ear and skull. Conventional eyewear ear supports occupy the area between the upper ear and skull. Where the audio appliance is "headphone like" and presses the ears inward, skin bruising or painful compression can occur. Where the audio appliance depends from the ears alone for support, the audio appliance and glasses compete for the space between the ear and skull. If both structures are present, the ears are bent outward and the need for downward support from the ear is compromised. If the structures are stacked and the conventional eyewear support is on top, the eyewear is tilted and does not fit properly. If the structures are stacked such that the conventional eyewear support is on bottom, the audio appliance may not fit properly or may move to the outside of the eyewear and worsen the discomfort to the user.

In terms of conventional eyewear alone, most lanyard devices can cause discomfort. Where the lanyard device is near the front of the eyewear, the lanyard device can get in the way and snag the users hands any time that movement near the hanging, drooping lanyard is engaged. A lanyard attached near the distal ends of the ear pieces is much more likely to form an unwanted irritation for the user. Further, where a loop lanyard is attached to an area at the distal-most area of the conventional eyewear supports, it may likely fail to prevent the eyewear from striking the ground as the lanyard attachment loop may become weak and/or slip to the point of disengagement.

Further, conventional lanyards can be distracting. The user can see forward mounted lanyards move when the head moves, and rearwardly connected lanyards can bunch and tangle near the collar to cause an annoyance for the user. Where the user is not wearing a collar, a lanyard trailing from conventional eyewear can cause further annoyance.

Lastly, most conventional lanyards typically have a bare minimum structure in order to be as universally utilizable as possible. This minimalist structure is typically cheap, intended only to provide minimal restraint should the eyewear become dislodged, and does little to increase the user's comfort. Because the conventional lanyard is meant for use with different sized heads and different types of eyewear, restraint upon the eyewear dislodgement from the user's head is the only function which can be realistically achieved. In cases where the eyewear is heavy and becomes dislodged from the user's head frequently, the lanyard may fail or damage may still result in damage where the eyewear can strike a table top. Further, most conventional lanyards do nothing to increase the user's comfort.

SUMMARY OF THE INVENTION

An audio lanyard audio device provides a number of advantages not seen with earlier devices. First, the audio lanyard has a pair of soft openings to accept the ear pieces of conventional eyewear in a manner that supports and engages several inches of the ear pieces of conventional eyewear with sufficient surface area and friction to hold the conventional eyewear securely. Second, the audio lanyard, by engaging a significant length of the conventional eyewear, provides a length of softer foam material for fitting both the lanyard and convention eyewear ear pieces between the ear and head in a more body shape accommodating manner, in essence padding the conventional eyewear ear pieces against the ear and head.

Third, the audio lanyard forms a balanced combination when worn with conventional eyewear. The rear part of the lanyard contains all of the electronics necessary for operation, and helps counterbalance the conventional eyewear. Although the audio lanyard is flexible, it has a shape meant to fit around the rear of the human head and helps lighten the burden of supporting the conventional eyewear. This counterbalancing, combined with the lack of excess length, enables the audio lanyard and conventional eyewear combination to be worn in a more secure, balanced and stable manner.

Fourth, the controls and main electronics and battery for the audio lanyard are located at the rear and are easily reachable by the user. A simple control bar can provide for volume control, music and station selection, and more. Because the outer housing is preferably made from a polymeric material, it is flexible and waterproof. Because of the location of the electronics, the audio lanyard will not get in the way during physical activities such as weight lifting, jogging, racquetball, and more.

Because the audio lanyard can further isolate an external battery acceptance cavity from the internal electronics, the moisture from either the environment or sweat cannot enter and degrade the electronics. A much wider array of controllability and programmability is achievable by providing programmability and downloadability either through an infrared or electromagnetic port. As with other devices, battery rechargability can be had with electrical connection or electromagnetic induction.

BRIEF DESCRIPTION OF THE DRAWINGS

The invention, its configuration, construction, and operation will be best further described in the following detailed description, taken in conjunction with the accompanying drawings in which:

FIG. 3 is a bottom view of the audio lanyard of claims 1 & 2 and illustrating the an access door and showing one possible orientation for battery location;

FIG. 4 is an expanded sectional view of the left side arm of the audio lanyard of FIGS. 1–3 and illustrating an accommodation bore for interfit with an ear piece, and further illustrating one possible configuration for conductor placement; and FIG. 5 is a sectional view of the electronics housing section and illustrating one possible configuration for the space occupied by a circuit board and switch controls.

DETAILED DESCRIPTION OF THE PREFERRED EMBODIMENT

Figure 1:
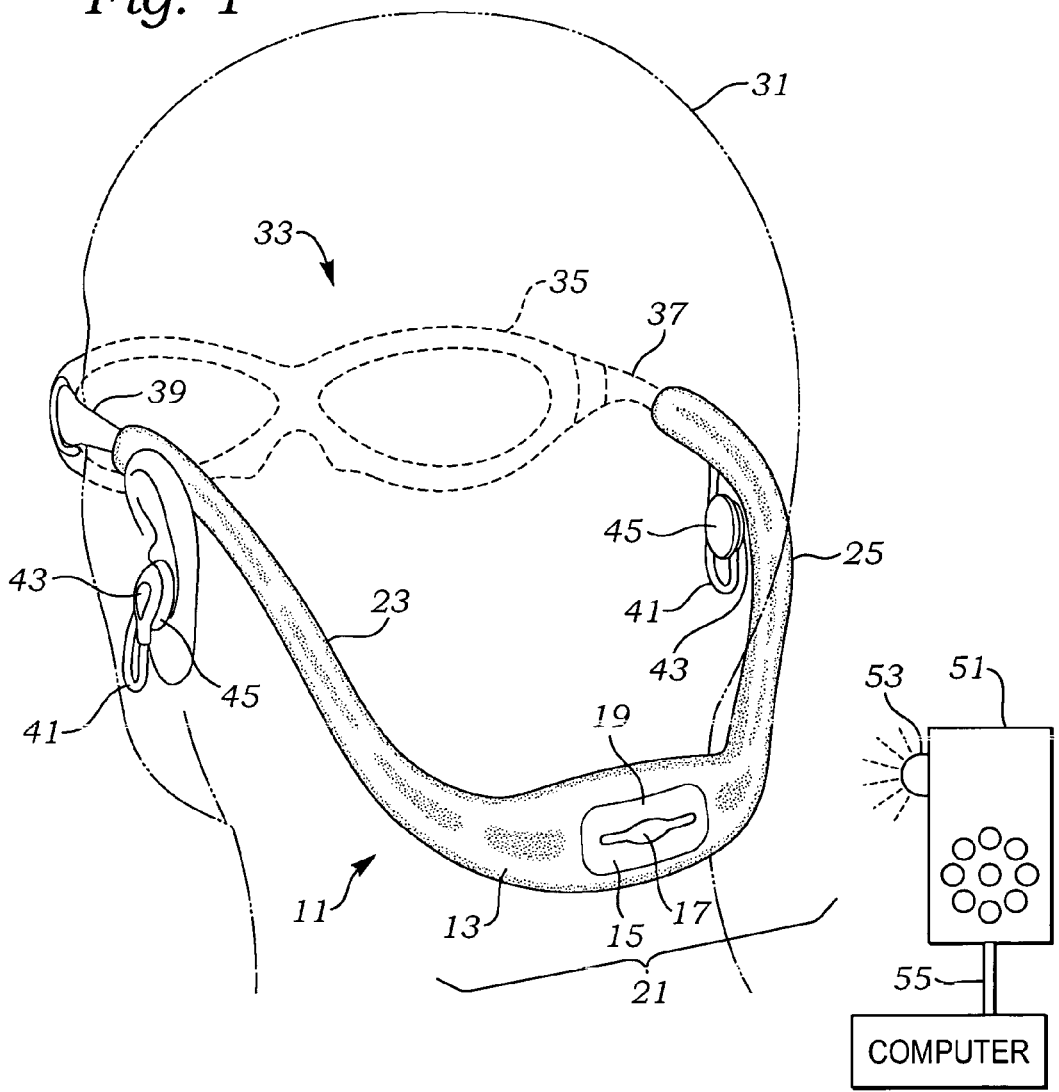
FIG. 1 is a perspective predominantly rearward view of the audio lanyard of the invention shown attached to eyeglasses and in a position worn on the head of a wearer, and seen in juxtaposition to a programming appliance optionally controlled by a computer.

An audio lanyard 11 includes a main continuous housing 13 having a control area 15 which is shown as including a raised manual touch bar 17. Other structures could be used to manually register the user to the specific controls of the control areas 15, including raised buttons structures, triangular structures and the like. For example, where the audio lanyard 11 is a radio, the manual touch bar 17 could have its middle area indicate a change in station, while the outer area to either side indicate up and down volumes. Where the audio lanyard 11 is a mp3 player, the manual touch bar 17 could have its middle area indicate a change in music selection, while the outer area to either side indicate up and down volumes. Other more specific controls are possible.

A light emitting diode (LED) port 19 is a possible structure which can be used to indicate an on or off condition, as well as to be used to perform infrared file transfers and programming information data. Other light ports are possible. Further, for runners, the LED port 19 can be used as a safety signaling light. As can be seen from the outline of the bulk of the middle portion of the audio lanyard 11, most of the electronics are expected to be mounted within this electronics housing section 21, unless more volume is needed. The internal area occupied by the electronics is not limited to the section 21 but may extend completely throughout a left side arm 23 and a right side arm 25.

The view of FIG. 1 is taken with respect to the rear of a user 31 wearing of conventional eyewear 33, also known as an eyewear set, eyeglasses set, or sunglasses set. Conventional eyewear 33 typically includes a front frame 35 and a right ear piece 37 and a left ear piece 39 which is typically hingedly attached to the front frame 35. The left ear piece 39 is seen extending into the distal portion of the left side arm 39 while the right ear piece 37 is seen extending into the distal portion of the right side arm 25.

Ideally, and as shown in FIG. 1, the side arm 23 is seen extending over the user's left ear and for a short distance forward of the left ear to insure that the padding of the side arm 23 helps protect and comfort the user 31 left ear. The shape of the side arm 23 will be seen to conform generally to the distal end of the left ear piece 39. For example, where the left ear piece 39 curves more severely about the ear of a user 31, the side arm 23 will curve downward more to form fit to the left ear piece 39, before curving back toward the electronics housing section 21.

Note however, that the side arms 23 and 25 are expected to hold the right and left earpieces 37 and 39 quite securely so that the user 31 need not have to limit himself to eyewear 33 that hooks around the ears. Further, because the fit is so secure, the user 31 can vary the fit of the side arms 23 and 25 along the lengths of the right and left ear pieces 37 and 39 to control the level of play in the side arms 23 and 25. This in essence controls the overall surrounding fit of the combination of the conventional eyewear 33 and audio lanyard 11.

From a point just forward of the user's ear, a short flexible cord 41 extends to an insertable ear phone 43. Ear phone 43 will preferably have a replaceable foam or polymeric pad 45. The short length of flexible cord 41 should be long enough to accommodate different users 31 and yet enable them to position the ear phone 43 in a comfortable position. More pliable and more dense pads 45 enable the user to place them into the ear in a position where outside sounds will be eliminated. More open cell and less dense pads 45 enable the user to place them into the ear in a position where outside sounds will be admitted, in addition to sounds from the ear phones 43.

FIG. 1 also illustrates a programming appliance 51 in optical communication with the light emitting diode (LED) port 19. The programming appliance 51 may have a series of buttons 53 which communicate with an internal microprocessor (not shown) which is in further communication with a light emitting diode (LED) 53. LED 53 can optically communicate with LED port 19 and enables programming appliance 51 to be used to program the electronics within the electronics housing section 21. Programming for either a radio or mp3 player may include a user 31 specifying their sound quality, volume range, reverberation level, and more. Programming for a radio may include favorite stations, the order in which they are scanned, multiple scanning for certain stations, the skipping of undesired stations, local versus more sensitive reception, and fm stereo versus fm mono, and AM or FM bands. Programming for mp3 may include song order, multiple plays of certain songs per cycle, segregation of songs into selectable groups, and the programmable assignment of functions to other button areas in the control area 15.

The programming appliance 51 can exist as a stand alone appliance or it may be connected via any type of connection 55 to a computer 57. Having the programming appliance 51 work with a home or personal computer 57 will enhance the ability of users to control both content and programming to better control the audio lanyard 11. The elimination of messy connections further eliminates the likelihood of moisture invasion through a connection jack opening.

Figure 2:
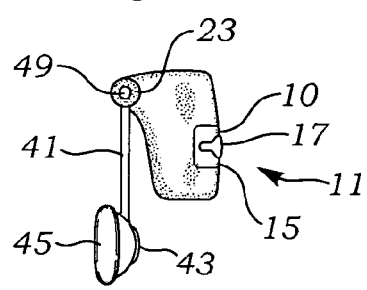
FIG. 2 is a view looking into one end of the audio lanyard seen in FIG. 1 with the eyeglasses removed and illustrating the eyeglass ear piece opening and ear phone.

Referring to FIG. 2, a view of the audio lanyard as it would appear lying flat on a table is seen. The left side illustrates side arm 23 as having an eyewear ear piece admission opening 49. The opening 49 is seen as small as it is shown in the relaxed state and would stretch to accommodate ear piece 39 and hold earpiece 39 snugly.

Referring to FIG. 3, a bottom view of the audio lanyard 11 illustrates a panel door 61 which can be used for component change out. The panel door 61 is located on the underside and preferably slightly recessed to shed moisture. At minimum the panel opening is expected to be used for battery change out, and a pair of batteries are shown in dashed line format as batteries. Further, the panel door 61 can also be used for complete interchange of components. An AM/FM radio module could be substituted for an mp3 player module, for example. FIG. 3 also illustrates the use of an ear phone 43 with an inner ear conforming structure 65 especially useful where the user wishes to block out all sounds but the sounds being received through the audio lanyard 11.

Referring to FIG. 4 an expanded sectional view of one possible arrangement for the left side arm 23 is seen. The opening 49 is seen to lead into a bore 67 having a blind end 69. Two conductors will typically lead to the ear phone 43, of which one conductor 71 is seen. The conductor types possible include a pair of separated conductors each embedded within the volume of the material from which side arm 23 is made, or the two conductors could be joined side by side within the volume of the material from which side arm 23 is made, or the two conductors could be co-axial within the volume of the material from which side arm 23 is made, and have an independent covering sheath or may depend upon the insulating characteristics of the material within which it is embedded.

Referring to FIG. 5, one possible realization of the inner volume within the audio lanyard 11 is illustrated. A circuit board 73 may be formed to fit within a space 75 within the electronics housing section 21. Where the material from which the audio lanyard 11 is made is particularly flexible, the opening covered by the door panel 61 may be stretched and the circuit board 73 added. Both the conductor 71 and matching conductor 79 may be connected to the circuit board 73 by connectors 81, as is the case for conductors 83 and 85. In this manner, the audio lanyard 11 body can be formed, complete with short flexible cord 41 and insertable ear phone 43, and the circuit board 73 added and connected later.

On the circuit board, a series of switches 91 are seen which can be manipulated through or outside of the control area 15. Also seen are a pair of electronic components 93 which may be memory chips or radio circuits. The batteries 63 may be accommodated behind the lower edge of the circuit board 73.

While the present invention has been described in terms of an audio lanyard, and especially having water proofed structure and structure which minimizes control complexity during use and provides for maximum controllability during programming, the present invention may be applied in any situation where isolation of components is to be combined with maximum programmability, and particularly where a structure such as the lanyard structure stabilizes and counterbalances another structure worn on the body.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. An audio lanyard comprising:
 a main housing having a space for enclosably supporting electronics, a right side arm and a left side arm, said right and left side arms angularly supported at an angle from said main housing, said right and left side arms each having an opening at their distal ends for insertion of a right and left ear piece of a conventional eyewear set, respectively;
 a first ear phone attached adjacent said left side arm distal end; and
 a second ear phone attached adjacent said right side arm distal end;
 wherein said audio lanyard forms a balanced combination when worn with said conventional eyewear set.

2. The audio lanyard as recited in claim 1 wherein said main housing has an identifiable control area to direct manual manipulation of said electronics.

3. The audio lanyard as recited in claim 2 wherein said identifiable control area further includes a raised manual touch bar.

4. The audio lanyard as recited in claim 1 and further comprising a first short flexible cord interposed between said first ear phone and said left side arm, and a second short flexible cord interposed between said second ear phone and said right side arm, for providing enhanced position ability of said first and said second ear phones.

5. The audio lanyard as recited in claim 1 wherein each of said ear phones include an inner conforming structure.

6. The audio lanyard as recited in claim 1 wherein said main housing includes a panel door for outside access.

7. The audio lanyard as recited in claim 6 wherein said panel door is located on an underside of said main housing.

8. The audio lanyard as recited in claim 1 wherein said opening of said right and left side arms leads to a blind bore.

9. The audio lanyard as recited in claim 1 and further comprising said conventional eyewear set having said right and left ear piece and engaged to said audio lanyard.

10. The audio lanyard as recited in claim 1 wherein said right and left side arms are tapered along a portion of said angular supported at an angle from said main housing, to provide a stable orientation of said main housing against a back of the neck of a wearer when said audio lanyard is worn along with a conventional eyewear set.

11. The audio lanyard as recited in claim 1 wherein said first and second ear phones extend from its associated side arm, when said audio lanyard can be worn with respect to a conventional eyewear set to allow the first and second ear phones to extend downward forward of the wearer's ear canal.

12. An audio lanyard comprising:
 a main housing having a space enclosably supporting electronics, a right side arm and a left side arm, said right and left side arms each having an opening for insertion of a right and left ear piece of a conventional eyewear set;
 a first ear phone attached adjacent said left side arm;
 a second ear phone attached adjacent said right side arm; and
 a light emitting diode port, connected to said electronics, to enable said electronics to communicate outside said main housing;
 wherein said audio lanyard forms a balanced combination when worn with said conventional eyewear set.

* * * * *